United States Patent [19]

Hirota et al.

[11] Patent Number: 4,941,565
[45] Date of Patent: Jul. 17, 1990

[54] DISPERSION FEEDER

[75] Inventors: Ryuichi Hirota, Miki; Masatomi Tsuruoka, Hyogo; Shinichi Inoue, Kobe, all of Japan

[73] Assignee: Yamato Scale Company, Limited, Akashi, Japan

[21] Appl. No.: 182,924

[22] Filed: Apr. 18, 1988

Related U.S. Application Data

[63] Continuation of Ser. No. 907,020, Sep. 15, 1986, abandoned.

[30] Foreign Application Priority Data

Dec. 17, 1985 [JP] Japan ............................ 60-194952[U]

[51] Int. Cl.$^5$ .............................................. B65G 47/72
[52] U.S. Cl. ..................................... 198/601; 198/533; 198/566; 198/760; 198/770; 177/25.18; 177/DIG. 11
[58] Field of Search ............... 198/504, 505, 533, 566, 198/601, 760, 763, 766, 767, 770, 771, 756, 757; 177/25.18, 58, DIG. 11; 222/200

[56] References Cited

U.S. PATENT DOCUMENTS

| | | | |
|---|---|---|---|
| 3,200,941 | 8/1965 | Heyer | 198/757 |
| 3,258,112 | 6/1966 | Allen et al. | 198/756 |
| 3,655,033 | 4/1972 | Lynch et al. | 198/757 |
| 3,680,683 | 8/1972 | Lebrevil | 198/257 |
| 3,943,668 | 3/1976 | McKibben | 198/756 |
| 4,384,535 | 5/1983 | McKelvie | 198/757 |
| 4,561,510 | 12/1985 | Sugioka et al. | 177/25.18 |
| 4,570,831 | 2/1986 | Izumi et al. | 198/756 |
| 4,596,327 | 6/1986 | Yamano | 198/533 |
| 4,600,096 | 7/1986 | Yamano et al. | 199/601 |
| 4,607,713 | 8/1986 | Nishi et al. | 177/25.18 |

FOREIGN PATENT DOCUMENTS

| | | | |
|---|---|---|---|
| 709237 | 5/1965 | Canada | 198/533 |
| 48315 | 5/1981 | Japan | 198/767 |
| 52426 | 4/1984 | Japan . | |
| 144532 | 9/1984 | Japan . | |
| 753594 | 8/1980 | U.S.S.R. | 198/756 |
| 1082702 | 3/1984 | U.S.S.R. | 198/533 |

Primary Examiner—Joseph E. Valenza
Attorney, Agent, or Firm—Senniger, Powers, Leavitt & Roedel

[57] ABSTRACT

A dispersion feeder used in a combination weighing machine for distributively feeding product to be weighed out to a plurality of weighing units arranged around it. The feeder is characterized in that it includes a mechanism for effecting rotational movement of the center or apex of its dispersion table. This movement exerts a centrifugal force on product fed onto the table, including product in and near the center of the table, thereby ensuring that such product is removed from the table.

8 Claims, 2 Drawing Sheets

DISPERSION FEEDER

This is a continuation of application Ser. No. 907,020, filed September 15, 1986 now abandoned.

This invention relates to a dispersion feeder which is especially useful in feeding product to be weighed out by a combination weighing machine to a plurality of weighing units arranged circularly around it.

BACKGROUND OF INVENTION

Dispersion feeders used for this purpose are disclosed, for example, in the opened Japanese utility model specification Nos. 59-144532 and 59-52426. In these prior art dispersion feeders, a generally conical dispersion table is driven rotationally or vibrationally about its axis with or without vertical vibration and, therefore, the center or apex of the dispersion table remains at a fixed position. This has resulted in a problem in that product is apt to stay in the central or apex area of the table. This problem is especially severe when the product is sticky and/or soft as in the case of raisins, raw meat and the like.

Therefore, an object of this invention is to provide an improved dispersion feeder which can remove product automatically from the central area of its dispersion table.

SUMMARY OF INVENTION

This object can be attained by constructing the dispersion feeder so that its dispersion table can be driven to cause its center or apex to follow a circular trace or path for removing the product from this area by the resultant centrifugal force.

To this end, the dispersion table of the present inventive dispersion feeder is supported on a platform which is, in turn, supported over a fixed base by a plurality of elastic supporting columns. The combined structure of the table and platform is provided with a centrifugal vibrator for producing a centrifugal force about the axis of the dispersion feeder.

Now, the invention will be described in detail below in conjunction with its embodiments with reference to the accompanying drawings.

BRIEF DESCRIPTION OF DRAWINGS

Throughout the drawings, the same reference numerals are given to like strutural components.

DESCRIPTION OF PREFERRED EMBODIMENTS

Figure 1:
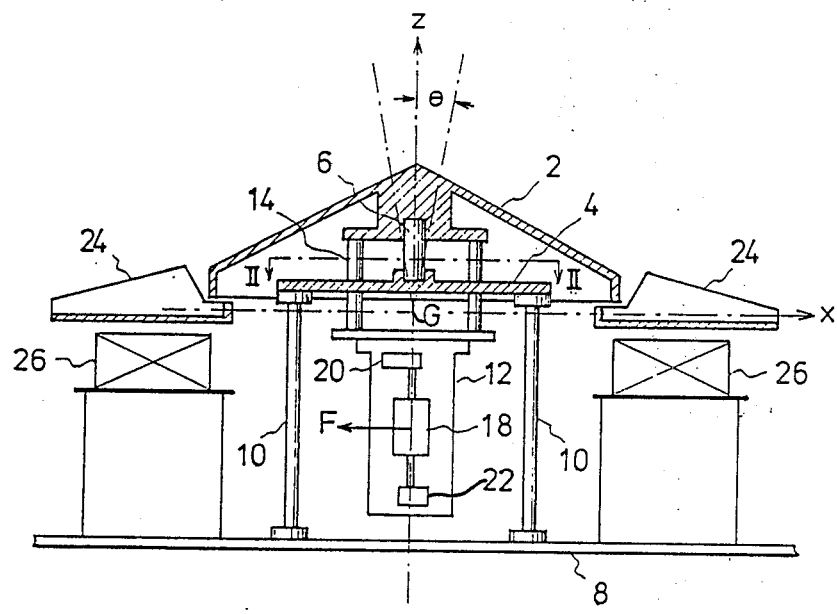
FIG. 1 is a schematic sectional side view representing a part of a combination weighing machine including an embodiment of the dispersion feeder according to this invention.
Figure 2:
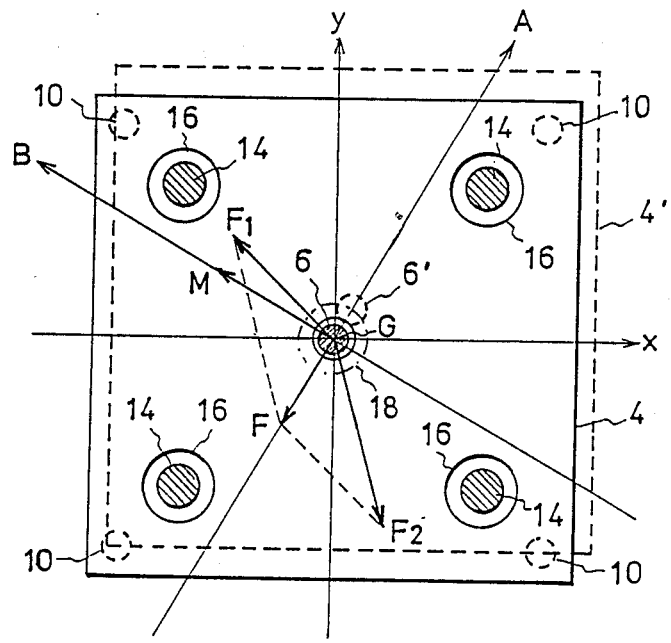
FIG. 2 is a sectional plan view taken along line II—II of FIG. 1 illustrating the operation of the inventive dispersion feeder.

Referring to FIGS. 1 and 2, there is shown a first embodiment of a dispersion feeder according to this invention including a generally conical dispersion table 2 which is supported above a generally square support plate 4 by an elastic column 6 in substantially concentric fashion. The support plate 4 which may be referred to as a first support base, is further supported at its corners above a fixed platform 8 which may be referred to as a second support base, of a combination weighing machine by four elastic columns 10. Under the support plate 4, a centrifugal vibrator 12 is hung from the dispersion table 2 by four rods 14 which extend downwardly from the dispersion table 2 and pass respectively through four holes 16 in the support plate 4, which are sufficiently larger in diameter than the rods. The centrifugal vibrator 12 includes a motor 18 fixed to its base frame and upper and lower eccentric rotors 20 and 22 fixed to the top and bottom ends of the motor shaft, respectively. The motor 18 operates to vibrationally drive the dispersion table 2 as described later. A plurality of linear feeders 24 are arranged radially around the dispersion table 2, so as to be vibrated selectively for a predetermined time by corresponding electromagnetic vibrators 26 which are disposed under them. In operation, a feeding device (not shown) such as belt conveyor feeds product onto the vicinity of the center or apex of the dispersion table 2 and the product is dispersed toward the pheriphery and received in the respective linear feeders 24. Each linear feeder 24 is actuated as occasion demands to supply product to corresponding weighing units (not shown) of the combination weighing machine.

Referring to FIGS. 1 and 2, the operation of the inventive dispersion feeder of FIG. 1 will now be described. As shown, the center of gravity G of the structure including dispersion table 2, support plate 4 and vibrator 12 is located under the support plate 4. Three orthogonal axes x, y and z fixed to the device originate from the center of gravity G. When the motor 18 of the centrifugal vibrator 12 drives the rotors 20 and 22, the spin of the rotors causes centrifugal forces $F_1$ and $F_2$, respectively, which are proportional to the masses, speeds and radii of rotation of the rotors. FIG. 2 shows the directions and magnitudes of these centrifugal forces at a certain instant in time. Originating from the center of gravity G is an A-axis colinear with the sum vector F of centrifugal forces $F_1$ and $F_2$, and a B-axis normal to the A-axis and z-axis. The A-axis and B-axis rotate about the z-axis according to the rotation of the rotors 20 and 22. The sum vector F is applied to a point, as shown in FIG. 1, between the rotors 20 and 22 since the centrifugal forces $F_1$ and $F_2$ appear at the positions of the rotors. (FIG. 1 shows a case where the A-axis coincides with the x-axis.) Accordingly, the sum vector F provides a moment M about the B-axis which displaces those structural components lying above the center of gravity G in the direction of the A-axis. The resultant displacement of the support plate 4 is shown exaggeratedly in FIG. 2 by dashed lines 4'. This displacement (i.e., orbital movement) is allowed by deflection of the flexible elastic columns 10 and has a magnitude at which the elastic force of the support columns is balanced with the centrifugal moment M. With the displacement of support plate 4, the bottom end of the elastic column 6 is also displaced to a position 6' as shown and revolves along a phantom circle 18. This results in eccentric revolution (precession) of the dispersion table 2 which produces another centrifugal force to bend the elastic column 6. Thus, the axis of distribution table 2 is inclined from the vertical by an angle $\theta$ at which the centrifugal force is balanced with the elastic force of the column 6, with the table making a revolution similar to the precession of a top. In other words, the center or apex of the dispersion table 2 makes a circular motion synchronous with the rotation of the rotors 20 and 22.

While the vibration of columns 6 and 10 are neglected in the above discussion, these columns have inherent frequencies of vibration which are not necessarily synchronous with the rotation of rotors 20 and 22. As a result, complicated vibrations are added to the above-mentioned revolution of dispersion table 2 to double its product dispsersing effect. Although this effect can be controlled, of course, by changing geometries of such elements as the rotors and columns, it can easily be controlled merely by changing the number of rotations of the rotors or the motor 18.

Thus, the resultant circular motion or revolution of the apex of dispersion table in the dispersion feeder of this invention prevents the product fed thereto from staying at and near the apex.

Figure 3:
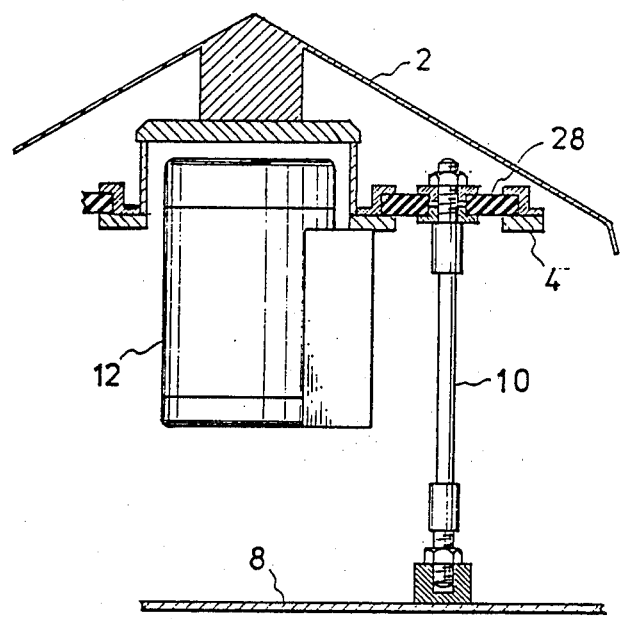
FIG. 3 is a partial sectional side view of another embodiment of this invention.
Figure 4:
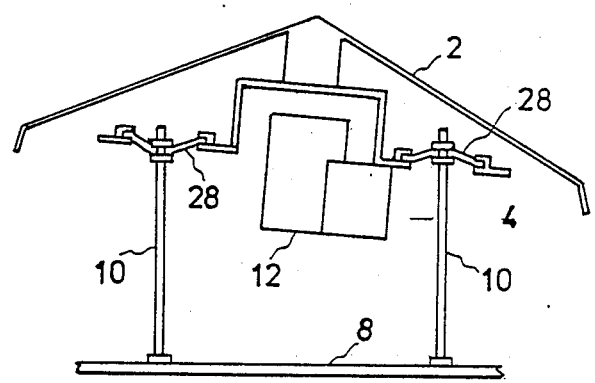
FIG. 4 is a schematic sectional side view of the embodiment of FIG. 3 illustrating its operation.

FIGS. 3 and 4 show a second embodiment of this invention, in which a conical dispersion table 2 is fixed directly to an upper support base or plate 4, rather than through the elastic column 6 of the first embodiment. The support plate 4 has a centrifugal vibrator 12 fixed thereto and is coupled to the flexible elastic columns 10 through relatively thin flat elastic coupling members or discs 28, each of which is generally annular in shape and disposed in or adjacent openings spaced at intervals around the support plate 4 (see FIG. 3). The columns 10 extend up through the openings in the support plate and through the annular discs. Each disc has an inner peripheral edge connected to a respective column 10 and an outer peripheral edge connected to the upper support plate 4. In this embodiment, the elastic discs 28 are subjected to a resultant centrifugal force similar to sum force F of FIGS. 1 and 2. As a result, the discs 28 are deflected upwardly and downwardly as shown in FIG. 4 thereby to slant the dispersion table 2. Thus, the same effect as in the first embodiment is obtainable.

Figure 5:
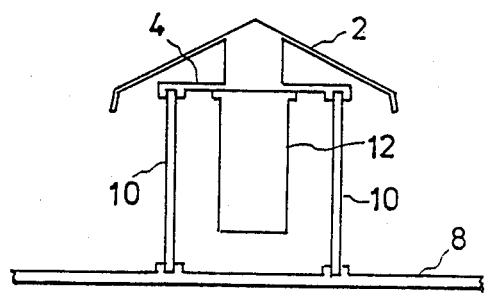
FIG. 5 is a schematic sectional side view of a third embodiment of this invention.

FIG. 5 shows a third embodiment of this invention, in which a conical dispersion table 2 is fixed directly to a support plate 4 and the support plate 4 is also fixed directly to elastic columns 10. In this embodiment, the dispersion table 2 will revolve within a horizontal plane about the z-axis with no inclination relative to this axis.

This invention is applicable to any type of dispersion table which is generally symmetric about its vertical axis, such as conical, spherical, pyramidal or flat-circular tables, whether shaped evenly or corrugated as shown in the former reference. The number of elastic columns 10 may be varied, though it is desirable to arrange these columns on a circle concentric with the dispersion table 2. Nor must the elastic columns be rod-shaped. For example, they may be a type of coiled spring or the like.

We claim:

1. A dispersion feeder for use in a combination weighing machine of the type having a plurality of weighing units circularly arranged around said dispersion feeder and a plurality of linear vibration feeders radially arranged between said dispersion feeder and respective weighing units for transferring product from said dispersion feeder to said weighing units; said dispersion feeder comprising a dispersion table generally symmetric about a vertical axis for dispersedly transferring product fed onto said table toward the periphery thereof, a first movable support base disposed under said table, a central elastic column having an upper end affixed to said dispersion table and a lower end affixed to said first support base for movably supporting said table above said first support base, a second suport base disposed under said first suport base, a plurality of elastic columns having upper ends affixed to said first support base and lower ends affixed to said second suport base for movably supporting said first support base above said second support base, and means affixed to said dispersion table for applying a force thereto to impart to said dispersion table a precessional movement about said vertical axis and to induce orbital movement of said first support base about said vertical axis.

2. A dispersion feeder as set forth in claim 1 wherein said force-applying means comprises a motor having a shaft rotatable on said vertical axis, at least one rotor on the shaft having a center of gravity offset from said shaft, and means connecting the motor to said dispersion table.

3. A dispersion feeder as set forth in claim 2 wherein said connecting means comprises a plurality of rods suspending said motor from said dispersion table.

4. A dispersion feeder as set forth in claim 1 wherein said central elastic column is the only connection between said first support base and said dispersion table.

5. A dispersion feeder as set forth in claim 1 wherein each of said plurality of elastic columns is sustantially incompressible in the direction of its longitudinal axis but is adapted for lateral deflection to permit said orbital movement of the first support base relative to the second support base.

6. A dispersion feeder as set forth in claim 1 wherein said dispersion table has a periphery which projects outwardly beyond the periphery of said first support base whereby product is adapted to fall off the table into said linear vibration feeders.

7. A dispersion feeder for use in a combination weighing machine of the type comprising a plurality of weighing units circularly arranged around the dispersion feeder and a plurality of linear vibration feeders radially arranged between said dispersion feeder and respective weighing units for transferring product from said dispersion feeder to said weighing units, said dispersion feeder comprising a dispersion table generally symmetric about a vertical axis for dispersedly transferring product fed onto said table toward the periphery thereof, an upper movable support base for supporting the dispersion table, a substantially stationary lower support base, a plurality of elastic columns coupled at their lower ends to the lower support base, means comprising a relatively thin flat elastic member coupling the upper end of each elastic column to the upper support base and permitting relative movement between the upper support base and the column, and means mounted on the upper support base for applying a force to the upper support base and causing it to move relative to the columns by deflection of said elastic members in such a way as to impart precessional motion to the dispersion table.

8. A dispersion feeder as set forth in claim 7 wherein said elastic members are generally annular in shape and disposed in or adjacent openings in the upper support base spaced at intervals therearound, said elastic columns extending up through said openings and said annular elastic members, each elastic member having an inner peripheral edge connected to a respective elastic column and an outer peripheral edge connected to said upper support base.

* * * * *